United States Patent
Minami (10) Patent No.: US 11,994,326 B2
(45) Date of Patent: May 28, 2024

(54) REFRIGERANT LEAKAGE DETECTION SYSTEM

(71) Applicant: DAIKIN INDUSTRIES, LTD., Osaka (JP)

(72) Inventor: Junya Minami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/387,922

(22) Filed: Nov. 8, 2023

(65) Prior Publication Data

US 2024/0068723 A1     Feb. 29, 2024

Related U.S. Application Data

(63) Continuation of application No. PCT/JP2022/020408, filed on May 16, 2022.

(30) Foreign Application Priority Data

May 21, 2021   (JP) .................................. 2021-086543

(51) Int. Cl.
*F25B 49/02*       (2006.01)
*G01F 25/00*       (2022.01)

(52) U.S. Cl.
CPC ........ *F25B 49/02* (2013.01); *F25B 2500/222* (2013.01); *F25B 2700/04* (2013.01); *G01F 25/00* (2013.01)

(58) Field of Classification Search
USPC ........................................................ 702/183
See application file for complete search history.

(56) References Cited

U.S. PATENT DOCUMENTS

2005/0056031 A1* 3/2005 Jeong ............... F25B 49/005
                                                62/149
2005/0086952 A1* 4/2005 Nonaka ............. F25D 11/022
                                                62/129

(Continued)

FOREIGN PATENT DOCUMENTS

EP        3 859 249 A1    8/2021
GB        2554267 A       3/2018

(Continued)

OTHER PUBLICATIONS

International Search Report (PCT/ISA/210), issued in PCT/JP2022/020408, dated Jul. 12, 2022.

(Continued)

*Primary Examiner* — Paul D Lee
(74) *Attorney, Agent, or Firm* — Birch, Stewart, Kolasch & Birch, LLP (57) ABSTRACT

A refrigerant leakage detection system includes a first controller, and a second controller. The first controller uses a first method to determine the presence or absence of refrigerant leakage from the refrigerant circuit. The second controller uses a second method different from the first method to determine the presence or absence of refrigerant leakage from the refrigerant circuit. The refrigerant leakage detection system determines the presence or absence of refrigerant leakage from the refrigerant circuit on the basis of the determination result of the first controller and the determination result of the second controller. The refrigerant leakage detection system determines that there is a refrigerant leakage in the refrigerant circuit if the first controller determines that there is a refrigerant leakage from the refrigerant circuit and the second controller determines that there is a refrigerant leakage from the refrigerant circuit.

10 Claims, 5 Drawing Sheets

(56) References Cited

U.S. PATENT DOCUMENTS

| | | | | |
|---|---|---|---|---|
| 2009/0025406 | A1* | 1/2009 | Yoshimi | F25B 13/00 |
| | | | | 62/127 |
| 2010/0300129 | A1* | 12/2010 | Bean, Jr. | H05K 7/20827 |
| | | | | 62/509 |
| 2011/0174059 | A1* | 7/2011 | Yonemori | F25B 49/005 |
| | | | | 73/40 |
| 2013/0197745 | A1* | 8/2013 | Skelton | G01M 17/007 |
| | | | | 701/34.4 |
| 2016/0230644 | A1* | 8/2016 | Dudar | F01P 11/16 |
| 2018/0051922 | A1* | 2/2018 | Ochiai | F25B 49/005 |
| 2018/0080692 | A1* | 3/2018 | Honda | F25B 13/00 |
| 2021/0018200 | A1* | 1/2021 | Watanabe | F24F 11/62 |
| 2021/0199359 | A1* | 7/2021 | Grabon | F25B 49/02 |
| 2022/0187000 | A1 | 6/2022 | Yoshimi | |

FOREIGN PATENT DOCUMENTS

| | | |
|---|---|---|
| JP | 2008-96051 A | 4/2008 |
| JP | 2012-255648 A | 12/2012 |
| WO | WO 2016/046960 A1 | 3/2016 |
| WO | WO 2017/002215 A1 | 1/2017 |
| WO | WO 2020/067296 A1 | 4/2020 |
| WO | WO 2021/049463 A1 | 3/2021 |

OTHER PUBLICATIONS

International Preliminary Report on Patentability and English translation of the Written Opinion of the International Searching Authority for International Application No. PCT/JP2022/020408, dated Nov. 30, 2023.

* cited by examiner

REFRIGERANT LEAKAGE DETECTION SYSTEM

CROSS REFERENCE TO RELATED APPLICATIONS

This application is a Continuation of PCT International Application No. PCT/JP2022/020408, filed on May 16, 2022, which claims priority under 35 U.S.C. § 119(a) to Patent Application No. JP 2021-086543, filed in Japan on May 21, 2021, all of which are hereby expressly incorporated by reference into the present application.

TECHNICAL FIELD

The present disclosure relates to a refrigerant leakage detection system.

BACKGROUND ART

Conventionally, the technical idea of detecting refrigerant leakage by only one method is known. For example, in Patent Literature 1 (JP 2012-255648 A), there is known an air conditioner that detects refrigerant leakage on the basis of the degree of subcooling of a condenser.

SUMMARY

A refrigerant leakage detection system according to a first aspect is a system for a refrigeration cycle device having a refrigerant circuit. The refrigerant leakage detection system includes a first control unit, and a second control unit. The first control unit uses a first method to determine the presence or absence of refrigerant leakage from the refrigerant circuit. The second control unit uses a second method different from the first method to determine the presence or absence of refrigerant leakage from the refrigerant circuit. The refrigerant leakage detection system determines that there is a refrigerant leakage in the refrigerant circuit if the first control unit determines that there is a refrigerant leakage from the refrigerant circuit and the second control unit determines that there is a refrigerant leakage from the refrigerant circuit.

DESCRIPTION OF EMBODIMENTS

Hereinafter, a refrigerant leakage detection system 1 according to the present disclosure will be described with reference to the drawings as appropriate. Hereinafter, however, unnecessarily detailed description may be omitted. For example, detailed descriptions of already well-known matters and duplicate descriptions for substantially the same configurations may be omitted. This is to avoid unnecessary redundancy in the following description and to facilitate the understanding of those skilled in the art.

First Embodiment (1) Overall Configuration

Figure 1:
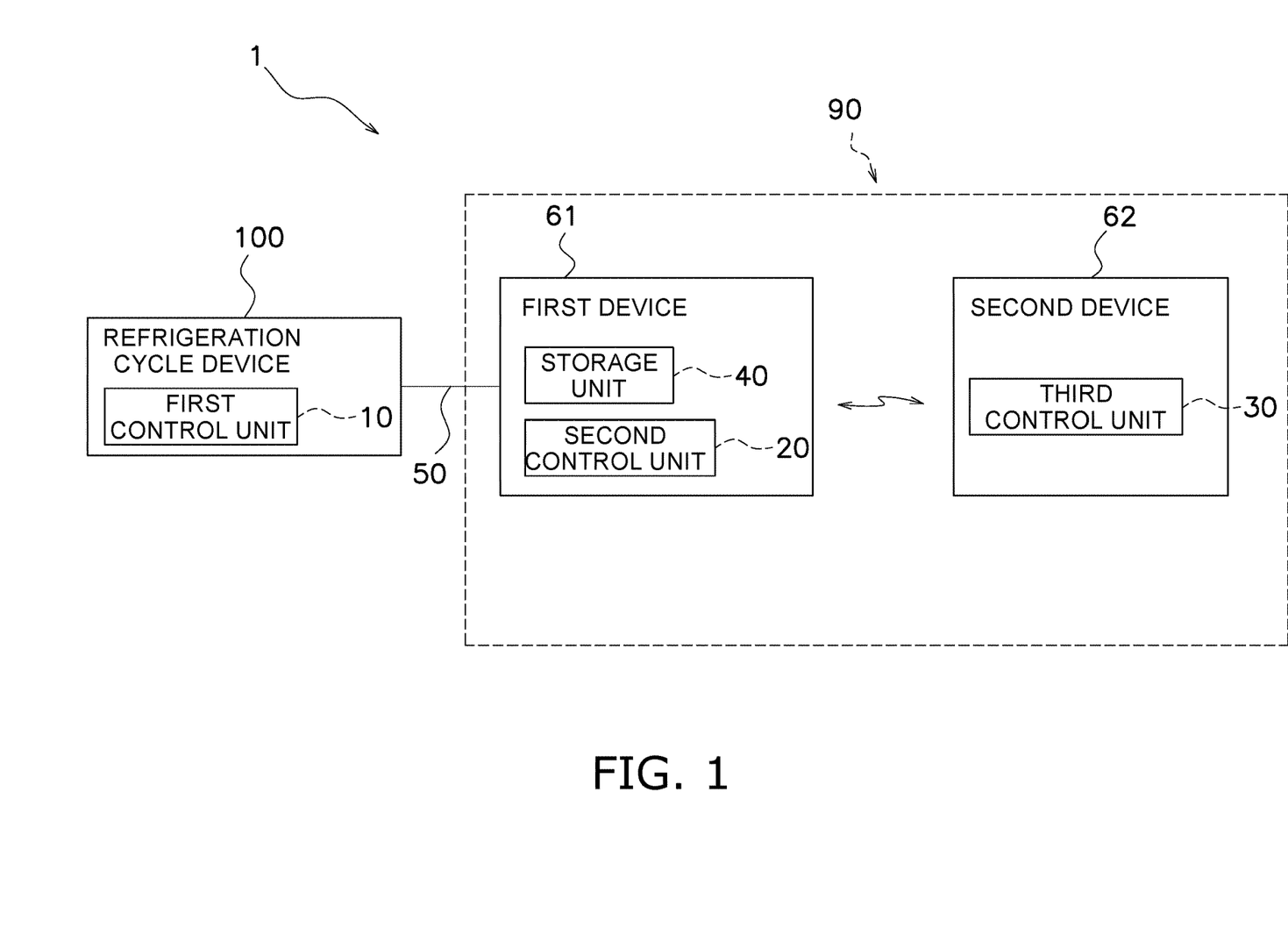
FIG. 1 is a schematic diagram illustrating the overall configuration of a refrigerant leakage detection system.

An outline of the refrigerant leakage detection system 1 will be described with reference to FIG. 1. FIG. 1 schematically illustrates the overall configuration of the refrigerant leakage detection system 1.

As illustrated in FIG. 1, the refrigerant leakage detection system 1 according to the present embodiment includes a refrigeration cycle device 100, a system management device 90, and a communication line 50. The refrigeration cycle device 100 achieves indoor air conditioning in office buildings or the like by performing vapor compression refrigeration cycle operation. The refrigeration cycle device 100 is, for example, an air conditioner. The system management device 90 includes a first device 61 that centrally manages the refrigeration cycle device 100 and a second device 62 that remotely manages the refrigeration cycle device 100. The communication line 50 is a cable that connects the refrigeration cycle device 100 to the system management device 90. The refrigerant leakage detection system 1 transmits and receives various signals and information through the communication line 50. The communication line 50 is, for example, a twisted pair cable. However, the communication line 50 may be a coaxial cable or another known cable. Alternatively, the refrigeration cycle device 100 and the system management device 90 may transmit and receive various information and signals via wireless communication.

(2) Detailed Configuration (2-1) Refrigeration Cycle Device

Figure 2:
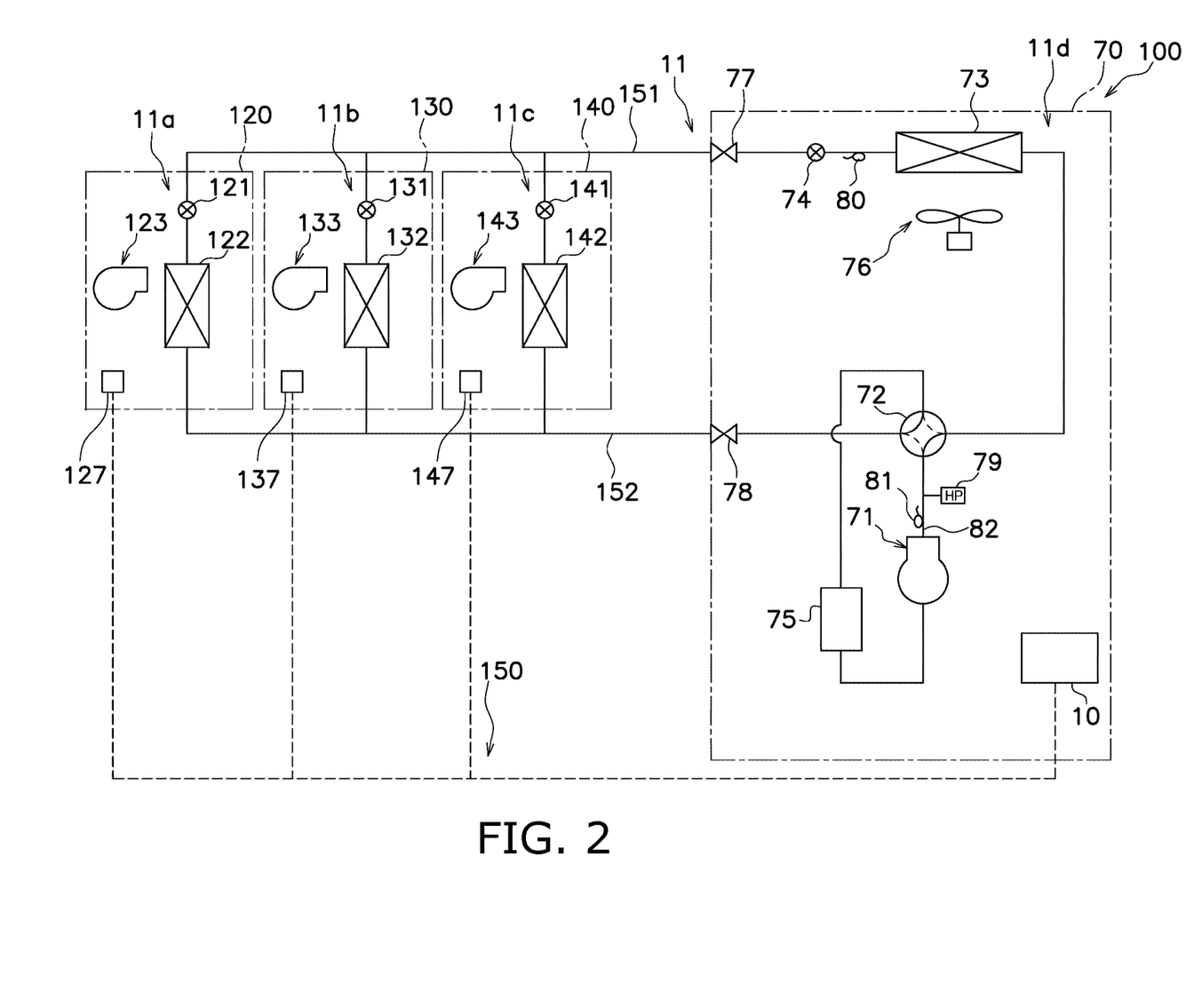
FIG. 2 is a schematic diagram illustrating the overall configuration of a refrigeration cycle device.
Figure 3:
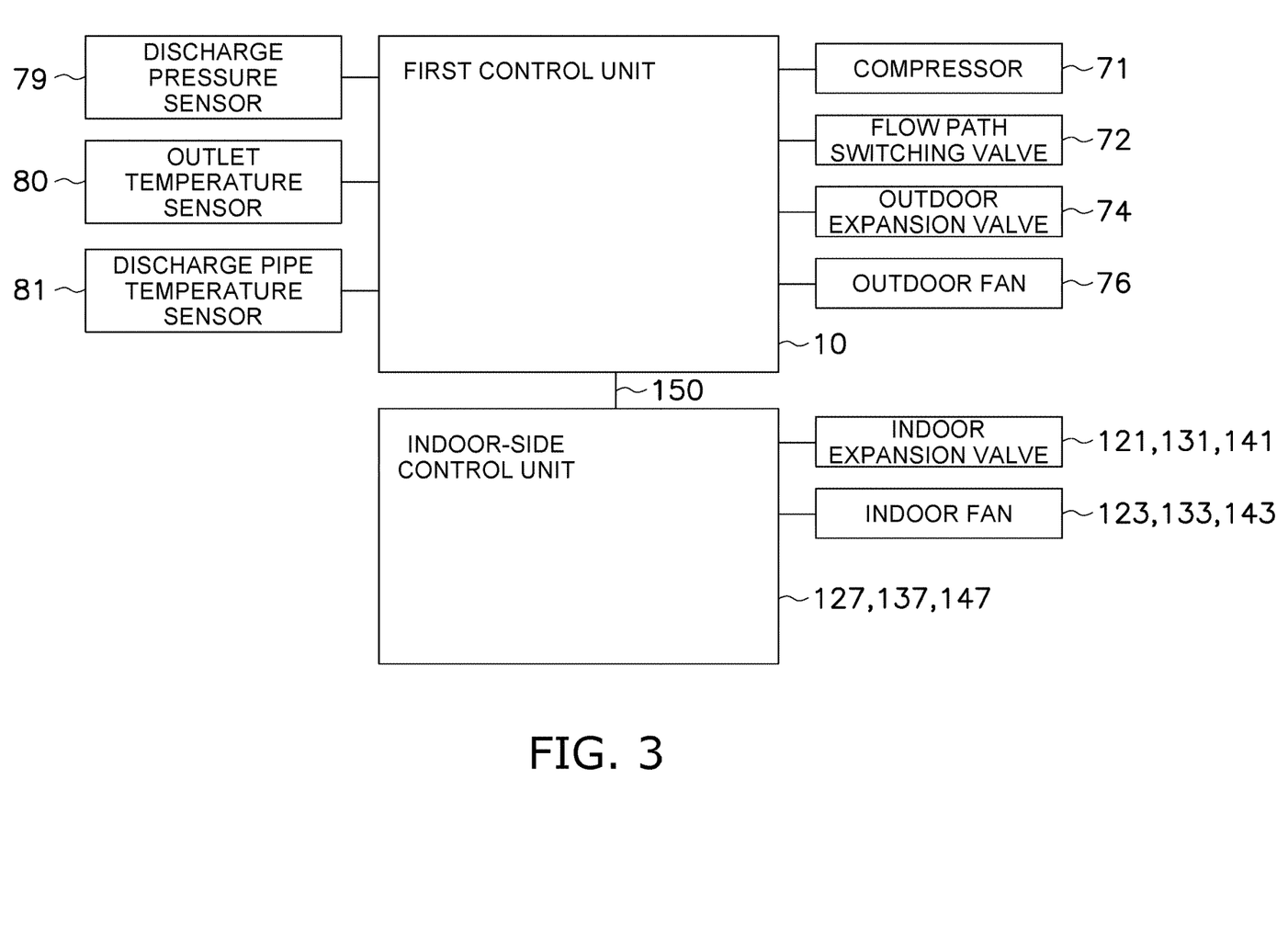
FIG. 3 is a block diagram illustrating the configurations of a first control unit and an indoor-side control unit.

The configuration of the refrigeration cycle device 100 will be described with reference to FIGS. 2 and 3. FIG. 2 schematically illustrates the overall configuration of the refrigeration cycle device 100. FIG. 3 is a block diagram illustrating the configurations of a first control unit 10 and indoor-side control units 127, 137, and 147.

As illustrated in FIG. 2, the refrigeration cycle device 100 mainly has a single outdoor unit 70 and a plurality of indoor units 120, 130, and 140 connected to the outdoor unit 70. In addition, the outdoor unit 70 and the indoor units 120, 130, and 140 are connected via a liquid-refrigerant connection pipe 151 and a gas-refrigerant connection pipe 152 to constitute a refrigerant circuit 11.

Note that the refrigeration cycle device 100 according to the present embodiment has an operating period of 5 years.

(2-1-1) Indoor Unit

The configurations of the indoor units 120, 130, and 140 will be described. In the present embodiment, the configuration of the indoor unit 120 is substantially the same as the configurations of the indoor units 130 and 140. Therefore, only the configuration of the indoor unit 120 will be described herein, and the configurations of the indoor units 130 and 140 will be denoted with reference numerals in the 130 series and 140 series, respectively, in place of the reference numerals in the 120 series indicating the parts of the indoor unit 120, and the description of the respective parts will be omitted.

The indoor unit 120 is a utilization-side unit that is installed on the ceiling or the like of an indoor space. The indoor unit 120 mainly has an indoor expansion valve 121, an indoor heat exchanger 122, and an indoor fan 123. The indoor unit 120 also includes an indoor-side refrigerant circuit 11a (indoor-side refrigerant circuit 11b in the indoor unit 130, and indoor-side refrigerant circuit 11c in the indoor unit 140) that is part of the refrigerant circuit 11.

The indoor expansion valve 121 is an electronic expansion valve connected to the liquid side of the indoor heat exchanger 122, and adjusts the pressure and flow rate of the refrigerant flowing through the indoor-side refrigerant circuit 11a. Note that the indoor expansion valve 121 is not limited to an electronic expansion valve, and any mechanism generally used as an expansion mechanism in a refrigeration cycle device may be selected as appropriate.

The indoor heat exchanger 122 exchanges heat between air and refrigerant. The indoor heat exchanger 122 functions as an evaporator for the refrigerant during cooling operation and cools indoor air. In addition, the indoor heat exchanger 122 functions as a condenser for the refrigerant during heating operation and heats indoor air. The indoor heat exchanger 122 according to the present embodiment is, for example, a cross-fin type fin-and-tube heat exchanger including a heat transfer tube and a large number of fins.

The indoor fan 123 is a fan that sucks indoor air into a casing (not illustrated) of the indoor unit 120. The indoor air sucked into the casing exchanges heat with the refrigerant flowing through the indoor heat exchanger 122, and then is supplied to the indoor space. As the indoor fan 123, for example, a centrifugal fan, a multiblade fan, or the like can be used.

The indoor unit 120 also has an indoor-side control unit 127 that controls the operation of the parts constituting the indoor unit 120. The indoor-side control unit 127 has a microcomputer, a storage device, and the like provided to control the indoor unit 120, and can communicate control signals with a remote controller (not illustrated) for individually operating the indoor unit 120, and communicate control signals with the outdoor unit 70 through the transmission line 150.

(2-1-2) Outdoor Unit

The outdoor unit 70 is a heat source unit installed on the rooftop or basement of a building. The outdoor unit 70 mainly has a compressor 71, a flow path switching valve 72, an outdoor heat exchanger 73, an outdoor expansion valve 74, an accumulator 75, an outdoor fan 76, a liquid-side shutoff valve 77, and a gas-side shutoff valve 78. The outdoor unit 70 also includes an outdoor-side refrigerant circuit 11d that is part of the refrigerant circuit 11.

The compressor 71 compresses low-pressure refrigerant into high-pressure refrigerant in a refrigeration cycle and discharges the compressed refrigerant into a discharge pipe 82.

Here, as the compressor 71, a compressor having a sealed structure in which a positive displacement compression element (not illustrated), such as a rotary or scroll type, is rotationally driven by a compressor motor is used. The motor can be controlled in rotational speed by an inverter. The capacity of the compressor 71 is controlled by controlling the rotational speed (operational frequency) of the motor. Note that although FIG. 2 illustrates an example of the outdoor unit 70 having one compressor 71, the configuration of the compressor 71 is not limited thereto. For example, the outdoor unit 70 may have a plurality of compressors 71 connected in parallel. In addition, if the outdoor unit 70 compresses the refrigerant in multiple stages, the outdoor unit 70 may have the plurality of compressors 71 connected in series.

The flow path switching valve 72 switches the refrigerant flow direction, thereby changing the state of the outdoor heat exchanger 73 between a first state in which the outdoor heat exchanger 73 functions as a condenser and a second state in which the outdoor heat exchanger 73 functions as an evaporator. Note that when the flow path switching valve 72 brings the outdoor heat exchanger 73 into the first state, the indoor heat exchangers 122, 132, and 142 function as evaporators. In addition, when the flow path switching valve 72 brings the outdoor heat exchanger 73 into the second state, the indoor heat exchangers 122, 132, and 142 function as condensers.

The outdoor heat exchanger 73 exchanges heat between air and refrigerant. The outdoor heat exchanger 73 functions as a condenser for the refrigerant during the cooling operation, and functions as an evaporator for the refrigerant during the heating operation. The outdoor heat exchanger 73 has the gas side connected to the flow path switching valve 72 and the liquid side connected to the outdoor expansion valve 74. The outdoor heat exchanger 73 according to the present embodiment is, for example, a cross-fin type fin-and-tube heat exchanger.

The outdoor expansion valve 74 is an electronic expansion valve that adjusts the pressure, flow rate, and the like of the refrigerant flowing in the outdoor-side refrigerant circuit 11d. The outdoor expansion valve 74 is disposed upstream of the outdoor heat exchanger 73 in the refrigerant flow direction during the heating operation (here, the outdoor expansion valve 74 is connected to the liquid side of the outdoor heat exchanger 73).

The accumulator 75 is a container having a gas-liquid separation function of separating the inflowing refrigerant into gas refrigerant and liquid refrigerant. The accumulator 75 also has the function of storing excess refrigerant generated in response to, for example, fluctuations in the operating loads of the indoor units 120, 130, and 140.

The outdoor fan 76 is a fan that sucks outdoor air into a casing (not illustrated) of the outdoor unit 70. The outdoor air sucked into the casing exchanges heat with the refrigerant in the outdoor heat exchanger 73, and then is discharged to the outside of the casing. The outdoor fan 76 according to the present embodiment is, for example, a propeller fan.

The liquid-side shutoff valve 77 and the gas-side shutoff valve 78 are provided at connecting ports to external equipment and pipes (specifically, the liquid-refrigerant connection pipe 151 and the gas-refrigerant connection pipe 152). The liquid-side shutoff valve 77 and the gas-side shutoff valve 78 according to the present embodiment are, for example, manually operated valves.

In addition, the outdoor unit 70 is provided with various sensors. Specifically, the outdoor unit 70 is provided with a discharge pressure sensor 79 that detects a discharge pressure Hp of the compressor 71, an outlet temperature sensor 80 that detects an outlet temperature Tb that is a refrigerant temperature on the outlet side of the outdoor heat exchanger 73, and a discharge pipe temperature sensor 81 that detects the temperature (hereinafter may be referred to as the discharge pipe temperature) of the refrigerant flowing through the discharge pipe 82. However, the sensors provided in the refrigeration cycle device 100 are not limited to the sensors 79, 80, and 81 described above. The refrigeration cycle device 100 may be provided with one or more sensors capable of detecting, for example, the indoor temperature and humidity, the outdoor temperature and humidity, the suction pressure (evaporation saturation temperature), the suction gas temperature, the discharge gas temperature, the refrigerant temperature on the inlet side of the indoor heat exchanger, the refrigerant temperature on the outlet side of the indoor heat exchanger, the refrigerant temperature on the inlet side of the outdoor heat exchanger, the rotational speed of the compressor 71, and the current value of the compressor 71.

The outdoor unit 70 also has the first control unit 10. The first control unit 10 has a control calculation device, a storage device, and the like (not illustrated). The control calculation device can execute programs stored in the storage device. The storage device stores a program for controlling the outdoor unit 70. The first control unit 10 is electrically connected to the compressor 71, the flow path switching valve 72, the outdoor expansion valve 74, the outdoor fan 76, the discharge pressure sensor 79, the outlet temperature sensor 80, and the discharge pipe temperature sensor 81 so as to enable exchange of control signals and information (see FIG. 3). The first control unit 10 is also electrically connected to the indoor-side control units 127, 137, and 147 through the transmission line 150 so as to enable exchange of control signals and information. Thus, the first control unit 10 can control the operation of various equipment constituting the outdoor unit 70, on the basis of the detection results detected by the various sensors and the commands related to the set temperature and operating mode received by the indoor-side control units 127, 137, and 147 from the remote controller. To supplement, the first control unit 10 can switch the states of the indoor unit between a thermo-on state and a thermo-off state on the basis of the degree of divergence between the set temperature set by the user of the indoor unit (for example, the indoor unit 120) through the remote controller and the air temperature of the space in which the indoor unit is installed. The thermo-on state refers to a state in which the refrigerant flows in the indoor heat exchanger (for example, indoor heat exchanger 122) and sufficient heat exchange is performed between the refrigerant and indoor air. The thermo-off state refers to a state in which no refrigerant flows in the indoor heat exchanger and substantially no heat exchange is performed between the refrigerant and indoor air.

Further, the first control unit 10 uses a first method to determine the presence or absence of refrigerant leakage from the refrigerant circuit 11. Details will be described later.

(2-2) System Management Device

The configuration of the system management device 90 will be described with reference to FIG. 1.

As illustrated in FIG. 1, the system management device 90 is a conceptually integrated device that includes the first device 61 connected to the refrigeration cycle device 100 and the second device 62 connected to the first device 61.

The first device 61 is a device (for example, a local controller) that centrally manages the refrigeration cycle device 100 on the basis of the operation data of the refrigeration cycle device 100 acquired through the communication line 50. As illustrated in FIG. 1, the first device 61 according to the present embodiment has a storage unit 40 and a second control unit 20.

The storage unit 40 is a memory including, for example, a ROM, a RAM, and the like. Here, an example in which the storage unit 40 is included in the first device 61 will be described, but the storage unit 40 may be included in the second device 62, the outdoor unit 70, or the like. The first data transmitted from the first control unit 10 is accumulated in the storage unit 40.

The second control unit 20 uses a second method to determine the presence or absence of refrigerant leakage from the refrigerant circuit 11. Details will be described later.

The second device 62 is a device (for example, a server) installed in a building different from the building in which the refrigeration cycle device 100 is installed. The second device 62 acquires the operation data acquired by the first device 61 and comprehensively manages the data. As illustrated in FIG. 1, the second device 62 according to the present embodiment has a third control unit 30.

The third control unit 30 determines the presence or absence of refrigerant leakage from the refrigerant circuit 11 on the basis of the determination result of the first control unit and the determination result of the second control unit 20. Details will be described later.

(3) First Control Unit, Second Control Unit, and Third Control Unit

The configurations of the first control unit 10, the second control unit 20, and the third control unit 30 will be described with reference to FIG. 1.

The first control unit 10, the second control unit 20, and the third control unit 30 are implemented by, for example, a computer. The first control unit 10, the second control unit 20, and the third control unit 30 include a control calculation device and a storage device (not illustrated). The control calculation device may be a processor such as a CPU or a GPU. The control calculation device reads a program stored in the storage device and performs predetermined calculation processing in accordance with the program. Further, the control calculation device can write the calculation results to the storage device, and read the information stored in the storage device, in accordance with the program. Hereinafter, the functions of the first control unit 10, the second control unit 20, and the third control unit 30, which are implemented by the control calculation device executing the programs stored in the storage device, will be described.

(3-1) First Control Unit

The function of the first control unit 10 included in the outdoor unit 70 will be described. The first control unit 10 uses the first method to determine the presence or absence of refrigerant leakage from the refrigerant circuit 11. The refrigerant leakage determination by the first method is based, for example, on the operational state of the refrigeration cycle device 100 during a first period. Details will be described below.

First, the first control unit 10 communicates with the various sensors and the like to acquire information related to the operational state of the refrigeration cycle device 100. Hereinafter, the information acquired by the first control unit 10 may be referred to as the first data. The first data includes, for example, the discharge pressure Hp, the outlet temperature Tb which is a refrigerant temperature on the outlet side of the outdoor heat exchanger, and the discharge pipe temperature. In addition, the first data may include information related to the indoor temperature and humidity, the outdoor temperature and humidity, the suction pressure (evaporation saturation temperature), the temperature of the refrigerant flowing through the suction pipe, the refrigerant temperature on the inlet side of the indoor heat exchanger, the refrigerant temperature on the outlet side of the indoor heat exchanger, the refrigerant temperature on the inlet side of the outdoor heat exchanger, the rotational speed of the compressor 71, the current value of the compressor 71, the opening degree of the outdoor expansion valve 74, the power on/off of the refrigeration cycle device 100, the thermo-on/off, the operating mode, the set temperature, and the like. The first data is preferably acquired as needed. The first control unit 10 transmits the acquired first data to the second control unit 20.

Next, the first control unit 10 determines the presence or absence of refrigerant leakage from the refrigerant circuit 11 on the basis of the first data for the first period. The first period falls within the range of 1 to 60 minutes. For example, if the first data is the discharge pipe temperature and the first period is 30 minutes, the first control unit 10 acquires the discharge pipe temperature for 30 minutes and determines whether the discharge pipe temperature satisfies a predetermined condition, thereby determining whether there is a refrigerant leakage from the refrigerant circuit 11. Here, if the discharge pipe temperature continues to be 100° C. or higher for 30 minutes, the first control unit 10 determines that the refrigerant is leaking from the refrigerant circuit 11.

The first control unit 10 transmits the results of the refrigerant leakage determination to the second control unit 20.

(3-2) Second Control Unit

The function of the second control unit 20 included in the first device 61 will be described. The second control unit 20 uses a second method to determine the presence or absence of refrigerant leakage from the refrigerant circuit 11. The refrigerant leakage determination by the second method is based, for example, on the operational state of the refrigeration cycle device 100 during a second period. Details will be described below.

The second control unit 20 stores the first data received from the first control unit 10 in the storage unit 40. The first data accumulated in the storage unit 40 is not deleted unless the first data is operated by an administrator or the like. As described above, since the operating period of the refrigeration cycle device 100 according to the present embodiment is years, the first data for 5 years is stored in the storage unit 40. In addition, preferably, the first data is acquired from the stage where the refrigeration cycle device 100 starts test operation, and stored in the storage unit 40. With this configuration, the first data during the test operation of the refrigeration cycle device 100 is stored in the storage unit 40.

The second control unit 20 calculates a first index value and a second index value on the basis of the first data stored in the storage unit 40. The second control unit 20 according to the present embodiment uses the first index value and the second index value to make refrigerant leakage determination.

The first index value is calculated on the basis of the first data acquired, for example, during the test operation of the refrigeration cycle device 100. Here, the first index value is the moving average of the degree of subcooling (hereinafter may be simply referred to as the "degree of subcooling") on the outlet side of the outdoor heat exchanger 73. As described above, the storage unit 40 stores the first data during the test operation of the refrigeration cycle device 100. In addition, the degree of subcooling on the outlet side of the outdoor heat exchanger 73 is the temperature difference between a condensation temperature Tc and the outlet temperature Tb of the condenser (outdoor heat exchanger 73), and is represented by Tc Tb. The condensation temperature Tc can be calculated from the discharge pressure Hp which is data included in the first data. The outlet temperature Tb of the condenser is included in the first data. On the basis of these sets of data, the second control unit 20 calculates the moving average (first index value) of the degree of subcooling during the test operation of the refrigeration cycle device 100. The first index value by the second control unit 20 may be calculated, for example, at the end of the test operation of the refrigeration cycle device 100 or at the time of the refrigerant leakage determination. If the first index value is calculated at the end of the test operation, the second control unit 20 only needs to acquire the first index value from the storage unit 40 at the time of the refrigerant leakage determination.

The second index value is calculated on the basis of the first data for the second period stored in the storage unit 40. For example, the second index value is the moving average of the degree of subcooling during the second period. The second period is longer than the first period and is one or more days. Here, an example in which the second period is from the start of the test operation of the refrigeration cycle device 100 to the present will be described. As described above, since the operating period of the refrigeration cycle device 100 according to the present embodiment is 5 years, the second index value here can be rephrased as the moving average of the degree of subcooling for 5 years. Note that the second index value is preferably calculated every time the second control unit 20 makes a refrigerant leakage determination.

The second control unit 20 determines whether or not the calculated divergence degree between the first index value and the second index value exceeds a predetermined threshold. As described above, the first index value is the moving average of the degree of subcooling measured during the test operation of the refrigeration cycle device 100. In other words, the first index value is the moving average of the degree of subcooling measured in a situation where no refrigerant leakage is assumed to be occurring from the refrigerant circuit 11. Therefore, if refrigerant leakage is occurring from the refrigerant circuit 11 during the second period, it is conceivable that the degree of divergence between the first index value and the second index value gradually increases and eventually exceeds the predetermined threshold. On the basis of the above findings, the second control unit 20 makes refrigerant leakage determination. In the refrigerant leakage determination by the second control unit 20, it is possible to detect refrigerant leakages, including minute refrigerant leakages such as slow leaks.

The results of the refrigerant leakage determination by the second control unit 20 are transmitted to the third control unit 30. The second control unit 20 also transmits the first data acquired from the first control unit 10 and the results of the refrigerant leakage determination to the third control unit 30.

(3-3) Third Control Unit

The function of the third control unit 30 included in the second device 62 will be described.

The third control unit 30 determines the presence or absence of refrigerant leakage from the refrigerant circuit 11 on the basis of the determination result of the first control unit and the determination result of the second control unit 20. Specifically, the third control unit 30 determines that there is a refrigerant leakage in the refrigerant circuit 11 if the first control unit 10 determines that there is a refrigerant leakage from the refrigerant circuit 11 and the second control unit 20 determines that there is a refrigerant leakage from the refrigerant circuit 11. Note that if the third control unit 30 determines that there is a refrigerant leakage, it is preferable to stop the operation of the refrigeration cycle device 100 and notify the administrator of the refrigeration cycle device 100.

(4) Overall Operation

Figure 4:
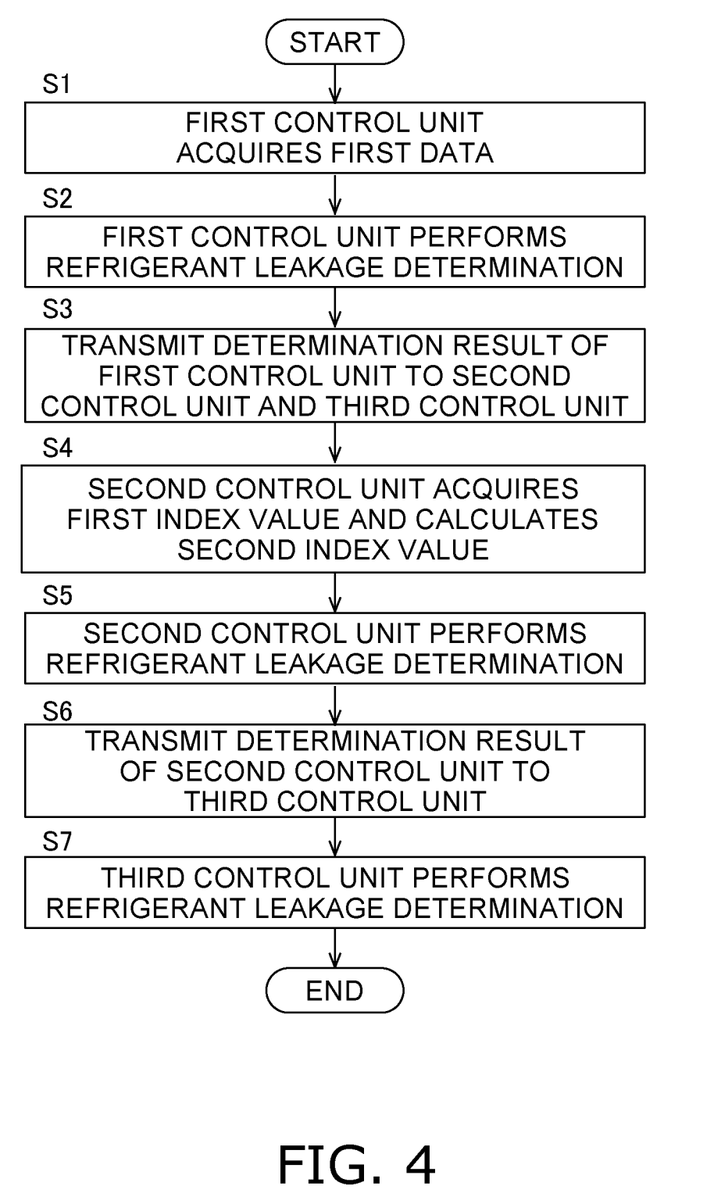
FIG. 4 is a flowchart illustrating a process for refrigerant leakage determination.

The flow of the refrigerant leakage determination performed in the refrigerant leakage detection system 1 according to the present embodiment will be described with reference to FIG. 4. Note that the processing flow illustrated in FIG. 4 is an example, and can be changed as appropriate. For example, as long as there is no inconsistency, the order of the steps may be changed, some of the steps may be executed in parallel with other steps, or other steps may be newly added.

In step S1, the first control unit 10 acquires the first data. The first data acquired by the first control unit 10 is transmitted to the first device 61 and stored (accumulated) in the storage unit 40 of the first device 61.

In step S2, the first control unit 10 makes refrigerant leakage determination in the refrigerant circuit 11 on the basis of the first data.

In step S3, the determination result of the first control unit 10 is transmitted to the second control unit 20 and the third control unit 30.

In step S4, the second control unit 20 acquires the first index value and calculates the second index value.

In step S5, the second control unit 20 makes refrigerant leakage determination in the refrigerant circuit 11 on the basis of whether or not the degree of divergence between the first index value and the second index value exceeds a predetermined threshold.

In step S6, the determination result of the second control unit 20 is transmitted to the third control unit 30.

In step S7, the third control unit 30 makes refrigerant leakage determination in the refrigerant circuit 11 on the basis of the determination results of the first control unit 10 and the second control unit 20.

(5) Features (5-1)

The degree of subcooling of the condenser may vary depending on aging, operating conditions, and the like of the air conditioner. In this case, erroneous detection of refrigerant leakage may occur. If refrigerant leakage is detected by only one method as described above, the detection accuracy is not sufficient.

The refrigerant leakage detection system 1 according to the present embodiment is a system for the refrigeration cycle device 100 having the refrigerant circuit 11. The refrigerant leakage detection system 1 includes the first control unit 10, the second control unit 20, and the third control unit 30. The first control unit 10 uses the first method to determine the presence or absence of refrigerant leakage from the refrigerant circuit 11. The second control unit 20 uses the second method different from the first method to determine the presence or absence of refrigerant leakage from the refrigerant circuit 11. The third control unit 30 determines the presence or absence of refrigerant leakage from the refrigerant circuit 11 on the basis of the determination result of the first control unit 10 and the determination result of the second control unit 20. The third control unit 30 determines that there is a refrigerant leakage in the refrigerant circuit 11 if the first control unit 10 determines that there is a refrigerant leakage from the refrigerant circuit 11 and the second control unit 20 determines that there is a refrigerant leakage from the refrigerant circuit 11.

In the refrigerant leakage detection system 1 according to the present embodiment, the third control unit 30 determines that there is a refrigerant leakage only when the refrigerant leakage is determined to be present in both the refrigerant leakage determination by the first method and the refrigerant leakage determination by the second method. With this configuration, even if erroneous detection of refrigerant leakage occurs in either the refrigerant leakage determination by the first method or the refrigerant leakage determination by the second method, the third control unit 30 does not determine that there is a refrigerant leakage as long as the remaining other method makes an accurate refrigerant leakage determination. Therefore, the refrigerant leakage detection accuracy is improved.

In addition, the refrigerant leakage detection system 1 according to the present embodiment is useful in detecting minute refrigerant leaks (so-called slow leaks). From the viewpoint of prevention of global warming, slow leaks should preferably be detected as much as possible. In order to detect slow leaks, it is conceivable to adopt a method of improving the detection sensitivity to refrigerant leakage by, for example, setting a lower threshold as a reference for refrigerant leakage determination. However, if the detection sensitivity to refrigerant leakage is improved, the possibility of erroneous detection of refrigerant leakage increases.

Meanwhile, in the refrigerant leakage detection system 1 according to the present embodiment, the third control unit 30 determines that there is a refrigerant leakage only when the refrigerant leakage is determined to be present in both the refrigerant leakage determination by the first method and the refrigerant leakage determination by the second method. In other words, in the present embodiment, only refrigerant leakages that are highly probable to such an extent as to be determined to be refrigerant leakages in both the first method and the second method are detected by the third control unit 30. This configuration enables both improved detection sensitivity to refrigerant leakage and suppression of erroneous detection. Therefore, slow leaks can be accurately detected.

(5-2)

In the refrigerant leakage detection system 1 according to the present embodiment, the first control unit 10 determines the presence or absence of refrigerant leakage on the basis of the operational state of the refrigeration cycle device 100 during the first period. The second control unit 20 determines the presence or absence of refrigerant leakage on the basis of the operational state of the refrigeration cycle device 100 during the second period that is longer than the first period.

There are two possible detection methods for refrigerant leakage in the refrigerant circuit 11: a detection method based on short-term acquired data (for example, the operational state of the refrigeration cycle device 100 during the first period) and a detection method based on long-term acquired data (for example, the operational state of the refrigeration cycle device 100 during the second period). When detecting a refrigerant leakage on the basis of the short-term data, various types of measurement values measured by various sensors can be referred to. In this method, since the presence or absence of refrigerant leakage can be determined from a multifaceted point of view, there is little possibility that erroneous detection of refrigerant leakage occurs even if a deviation occurs in the measurement values of some sensors. However, in the refrigerant leakage detection method based on the short-term acquired data, it is difficult to cope with changes in measurement values caused by aged deterioration or the like of the equipment constituting the refrigeration cycle device 100. Meanwhile, in the case of the refrigerant leakage detection based on the long-term data, it is conceivable to refer to the tendency (transition) of the measurement values of a specific sensor. This method can detect refrigerant leakage in consideration of aged deterioration and the like. However, the detection method based on the long-term acquired data may result in fewer types of referable data due to the communication amount and the storage capacity. This can cause erroneous detection if there is a deviation in the measurement values of the specific sensor.

In the refrigerant leakage detection system 1 according to the present embodiment, the third control unit 30 determines that there is a refrigerant leakage only when the refrigerant leakage is determined to be present in both the refrigerant leakage determination based on the operational state during the first period and the refrigerant leakage determination based on the operational state during the second period. With this configuration, even if erroneous detection occurs due to aged deterioration of the equipment or deviation of the measurement values in either the refrigerant leakage determination based on the operational state during the first period or the refrigerant leakage determination based on the operational state during the second period, the third control unit 30 does not determine that there is a refrigerant leakage as long as the remaining other refrigerant leakage determination is accurate. Therefore, the refrigerant leakage detection accuracy is improved.

(5-3)

In the refrigerant leakage detection system 1 according to the present embodiment, the operational state of the refrigeration cycle device 100 during the second period includes the operational state of the refrigeration cycle device 100 during test operation.

The refrigerant leakage detection system 1 according to the present embodiment can determine the presence or absence of refrigerant leakage with reference to the operational state during the test operation. In other words, the presence or absence of refrigerant leakage can be determined with reference to the operational state of the refrigeration cycle device 100 in which refrigerant leakage, aged deterioration of the equipment, or the like does not occur. Therefore, the refrigerant leakage detection accuracy is improved.

(5-4)

In the refrigerant leakage detection system 1 according to the present embodiment, the first period falls within the range of 1 to 60 minutes. The second period is one or more days.

(5-5)

In the refrigerant leakage detection system 1 according to the present embodiment, the first control unit 10 is included in the refrigeration cycle device 100. The second control unit is included in the first device 61 that centrally manages the refrigeration cycle device 100 or the second device 62 that remotely manages the refrigeration cycle device 100. The third control unit 30 is included in the second device 62.

(5-6)

The refrigerant leakage detection system 1 according to the present embodiment further includes the storage unit 40. The first control unit 10 periodically acquires the first data indicating the operational state of the refrigeration cycle device 100 during the first period. The first data is accumulated in the storage unit 40. The second control unit 20 calculates the moving average of the first data during the second period on the basis of the first data accumulated in the storage unit 40.

This configuration allows the second control unit 20 to detect refrigerant leakages on the basis of the moving average of the first data during the second period. Therefore, refrigerant leakages, including minute refrigerant leakages such as slow leaks, can be detected.

(6) Modifications

Modifications of the above embodiment will be described below. Modifications may be combined as appropriate, as long as there is no inconsistency. Note that configurations similar to those in the above embodiment are denoted with similar reference signs, and the detailed description thereof will be omitted.

(6-1) Modification 1A

Figure 5:
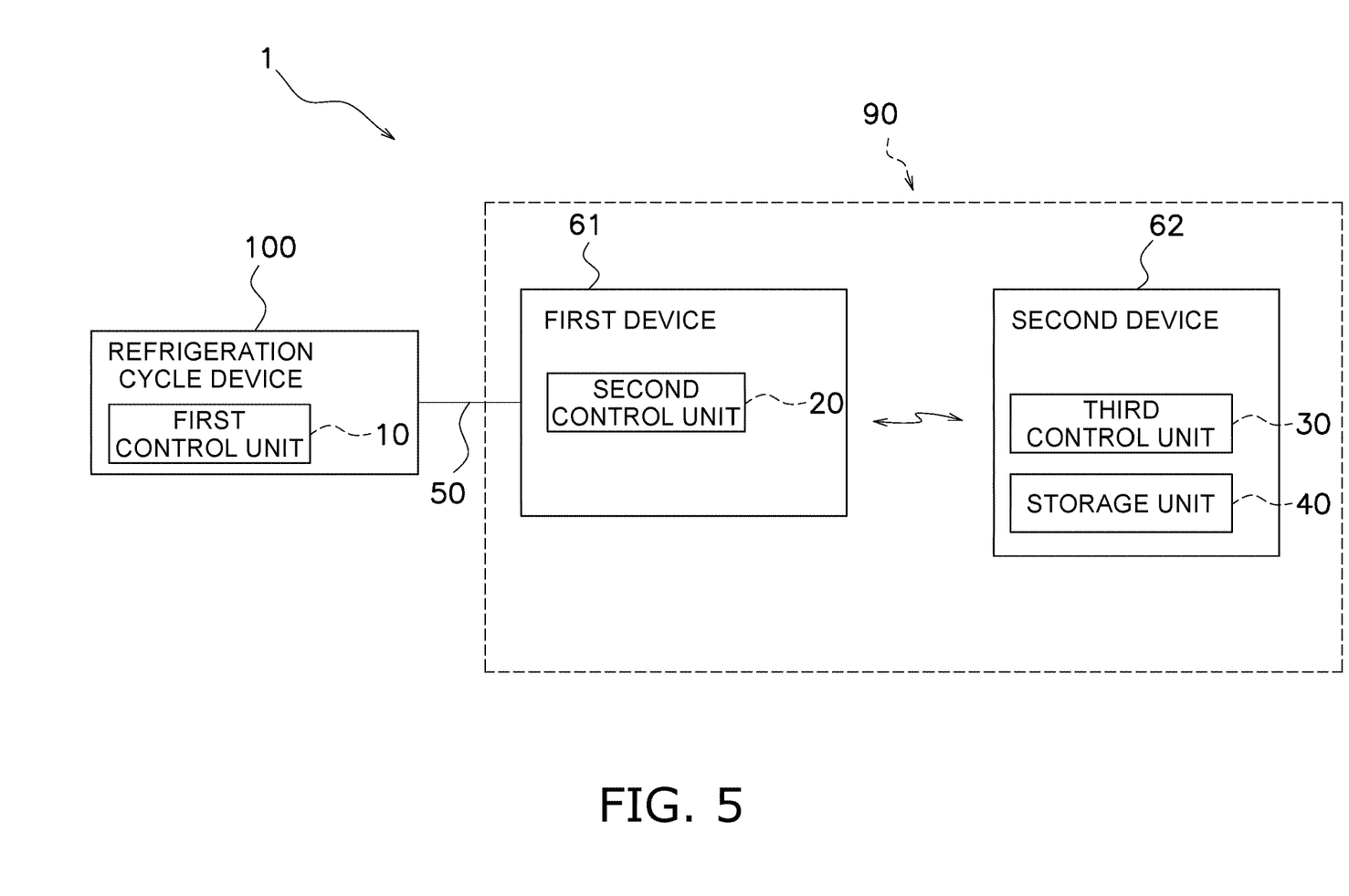
FIG. 5 is a schematic diagram illustrating the overall configuration of a refrigerant leakage detection system according to Modification 1A.

In the above embodiment, the configuration in which the second control unit 20 uses the second method to determine the presence or absence of refrigerant leakage from the refrigerant circuit 11 has been described. However, the third control unit 30 may use the second method to determine the presence or absence of refrigerant leakage from the refrigerant circuit 11. In this case, the storage unit 40 is provided in the second device 62 (see FIG. 5). The second control unit 20 uses the second method to determine the presence or absence of refrigerant leakage from the refrigerant circuit 11, acquires the results of refrigerant leakage determination from the first control unit 10, and finally determines the presence or absence of refrigerant leakage from the refrigerant circuit 11 on the basis of these results.

(6-2) Modification 1B

In the above embodiment, the third control unit 30 acquires the determination result of the first control unit 10 and the determination result of the second control unit 20, and determines the presence or absence of refrigerant leakage from the refrigerant circuit 11 on the basis of these results, but the present invention is not limited thereto. The second control unit may use the second method to determine the presence or absence of refrigerant leakage from the refrigerant circuit 11, acquire the results of the refrigerant leakage determination from the first control unit 10, and finally determine the presence or absence of refrigerant leakage from the refrigerant circuit 11 on the basis of these results. The second control unit 20 transmits the results of the refrigerant leakage determination to the third control unit 30.

(6-3) Modification 1C

In the above embodiment, an example of the first control unit 10 that determines the presence or absence of refrigerant leakage on the basis of the discharge pipe temperature has been described. However, the method of the refrigerant determination by the first control unit is not limited thereto. For example, the first control unit 10 may determine the presence or absence of refrigerant leakage using the indoor temperature and humidity, the outdoor temperature and humidity, the suction pressure (evaporation saturation temperature), the suction gas temperature, the refrigerant temperature on the inlet side of the indoor heat exchanger, the refrigerant temperature on the outlet side of the indoor heat exchanger, the refrigerant temperature on the inlet side of the outdoor heat exchanger, the rotational speed of the compressor 71, the current value of the compressor 71, and the like.

In addition, in the above embodiment, an example of the second control unit 20 that determines the presence or absence of refrigerant leakage by calculating the moving average of the degree of subcooling has been described. However, the method of the refrigerant determination by the second control unit 20 is not limited thereto. For example, the second control unit 20 may determine the presence or absence of refrigerant leakage by calculating the moving average of the discharge pipe temperature, the moving average of the discharge pressure Hp, or the like.

(6-4) Modification 1D

In the above embodiment, the second control unit 20 that determines the presence or absence of refrigerant leakage on the basis of whether or not the degree of divergence between the first index value and the second index value exceeds a predetermined threshold has been described. However, the content of the processing performed by the second control unit 20 is not limited to the above example. For example, the second control unit 20 may calculate a third index value.

The third index value represents the degree of aged deterioration of the equipment (for example, the compressor 71) constituting the refrigeration cycle device 100. The third index value can be calculated on the basis of the moving average of the rotational speed of the compressor 71, the discharge pressure Hp, the current value of the compressor 71, the opening degree of the outdoor expansion valve 74, and the like during the second period. The second control unit 20 according to the present modification calculates the third index value every time the second control unit 20 makes a refrigerant leakage determination.

In the case of calculating the third index value, the second control unit 20 further calculates a predetermined coefficient on the basis of the third index value, and corrects the value of the predetermined threshold by the coefficient. With this configuration, the refrigerant leakage determination can be made in response to the change in the second index value caused by the aged deterioration of the equipment (for example, the compressor 71) constituting the refrigeration cycle device 100. Therefore, erroneous detection of refrigerant leakage is suppressed.

(6-5) Modification 1E

In the above embodiment, the second control unit 20 that determines the presence or absence of refrigerant leakage on the basis of whether or not the degree of divergence between the first index value and the second index value exceeds a predetermined threshold has been described. However, the content of the processing performed by the second control unit 20 is not limited to the above example. For example, the second control unit 20 may refer to various information related to the operational state of the refrigeration cycle device 100 when making the refrigerant leakage determination.

For example, the second control unit 20 according to the present modification acquires, from the storage unit 40, information related to the power on/off of the refrigeration cycle device 100, information related to the thermo-on/off, and information related to the operating mode, set temperature, and the like. As a result, the second control unit 20 can confirm whether or not there is a special circumstance such as that the operation of the refrigeration cycle device 100 has not been performed for a long time, an irregular operating mode has been selected, or an irregular set temperature has been selected. If there is a special circumstance such as described above, it is preferable that the second control unit 20 further corrects the predetermined threshold value before making the refrigerant leakage determination. With this configuration, the refrigerant leakage determination can be made in consideration of various circumstances relating to the operation of the refrigeration cycle device 100. Therefore, erroneous detection of refrigerant leakage is suppressed.

OTHER EMBODIMENTS

While the embodiments according to the present disclosure have been described above, it will be understood that various changes in forms and details can be made without departing from the spirit and scope of the claims.

The present disclosure is not limited to the exact embodiments described above. The present disclosure can be embodied by modifying the constituent elements in the implementation stage without departing from the gist thereof. The present disclosure can also form various disclosures by appropriately combining the plurality of constituent elements disclosed in each of the above embodiments. For example, some constituent elements may be eliminated from all constituent elements disclosed in the embodiments. Further, the constituent elements may be combined as appropriate in different embodiments. Therefore, the present embodiments should be considered in all respects merely as examples and not as limiting, and are intended to include any modifications obvious to a person skilled in the art.

REFERENCE SIGNS LIST

1: refrigerant leakage detection system
10: first control unit
11: refrigerant circuit
20: second control unit
40: storage unit
61: first device
62: second device
100: refrigeration cycle device

CITATION LIST

Patent Literature

Patent Literature 1: JP 2012-255648 A

The invention claimed is:

1. A refrigerant leakage detection system for a refrigeration cycle device having a refrigerant circuit, the refrigerant leakage detection system comprising:
   a first controller that uses a first method to determine a presence or absence of refrigerant leakage from the refrigerant circuit; and
   a second controller that uses a second method different from the first method to determine the presence or absence of refrigerant leakage from the refrigerant circuit, wherein
   the refrigerant leakage detection system determines that there is a refrigerant leakage in the refrigerant circuit if the first controller determines that there is a refrigerant leakage from the refrigerant circuit and the second controller determines that there is a refrigerant leakage from the refrigerant circuit,
   the first controller determines the presence or absence of refrigerant leakage on the basis of an operational state of the refrigeration cycle device during a first period, and
   the second controller determines the presence or absence of refrigerant leakage on the basis of an operational state of the refrigeration cycle device during a second period that is longer than the first period.

2. The refrigerant leakage detection system according to claim 1, wherein the operational state of the refrigeration cycle device during the second period includes an operational state of the refrigeration cycle device during test operation.

3. The refrigerant leakage detection system according to claim 2, wherein
   the first controller is included in the refrigeration cycle device, and
   the second controller is included in a first device that centrally manages the refrigeration cycle device or a second device that remotely manages the refrigeration cycle device.

4. The refrigerant leakage detection system according to claim 2, further comprising memory, wherein
 the first controller periodically acquires first data indicating the operational state of the refrigeration cycle device during the first period,
 the first data is accumulated in the memory, and
 the second controller calculates a moving average of the first data during the second period on the basis of the first data accumulated in the memory.

5. The refrigerant leakage detection system according to claim 1, wherein
 the first period falls within a range of 1 to 60 minutes, and the second period is one or more days.

6. The refrigerant leakage detection system according to claim 5, wherein
 the first controller is included in the refrigeration cycle device, and
 the second controller is included in a first device that centrally manages the refrigeration cycle device or a second device that remotely manages the refrigeration cycle device.

7. The refrigerant leakage detection system according to claim 5, further comprising memory, wherein
 the first controller periodically acquires first data indicating the operational state of the refrigeration cycle device during the first period,
 the first data is accumulated in the memory, and
 the second controller calculates a moving average of the first data during the second period on the basis of the first data accumulated in the memory.

8. The refrigerant leakage detection system according to claim 1, wherein
 the first controller is included in the refrigeration cycle device, and
 the second controller is included in a first device that centrally manages the refrigeration cycle device or a second device that remotely manages the refrigeration cycle device.

9. The refrigerant leakage detection system according to claim 8, further comprising memory, wherein
 the first controller periodically acquires first data indicating the operational state of the refrigeration cycle device during the first period,
 the first data is accumulated in the memory, and
 the second controller calculates a moving average of the first data during the second period on the basis of the first data accumulated in the memory.

10. The refrigerant leakage detection system according to claim 1, further comprising memory, wherein
 the first controller periodically acquires first data indicating the operational state of the refrigeration cycle device during the first period,
 the first data is accumulated in the memory, and
 the second controller calculates a moving average of the first data during the second period on the basis of the first data accumulated in the memory.

* * * * *